July 17, 1962   W. A. CHIASSON   3,045,172
PHASE-SHIFTING AND CONTROL APPARATUS
Filed Nov. 28, 1958   3 Sheets-Sheet 3
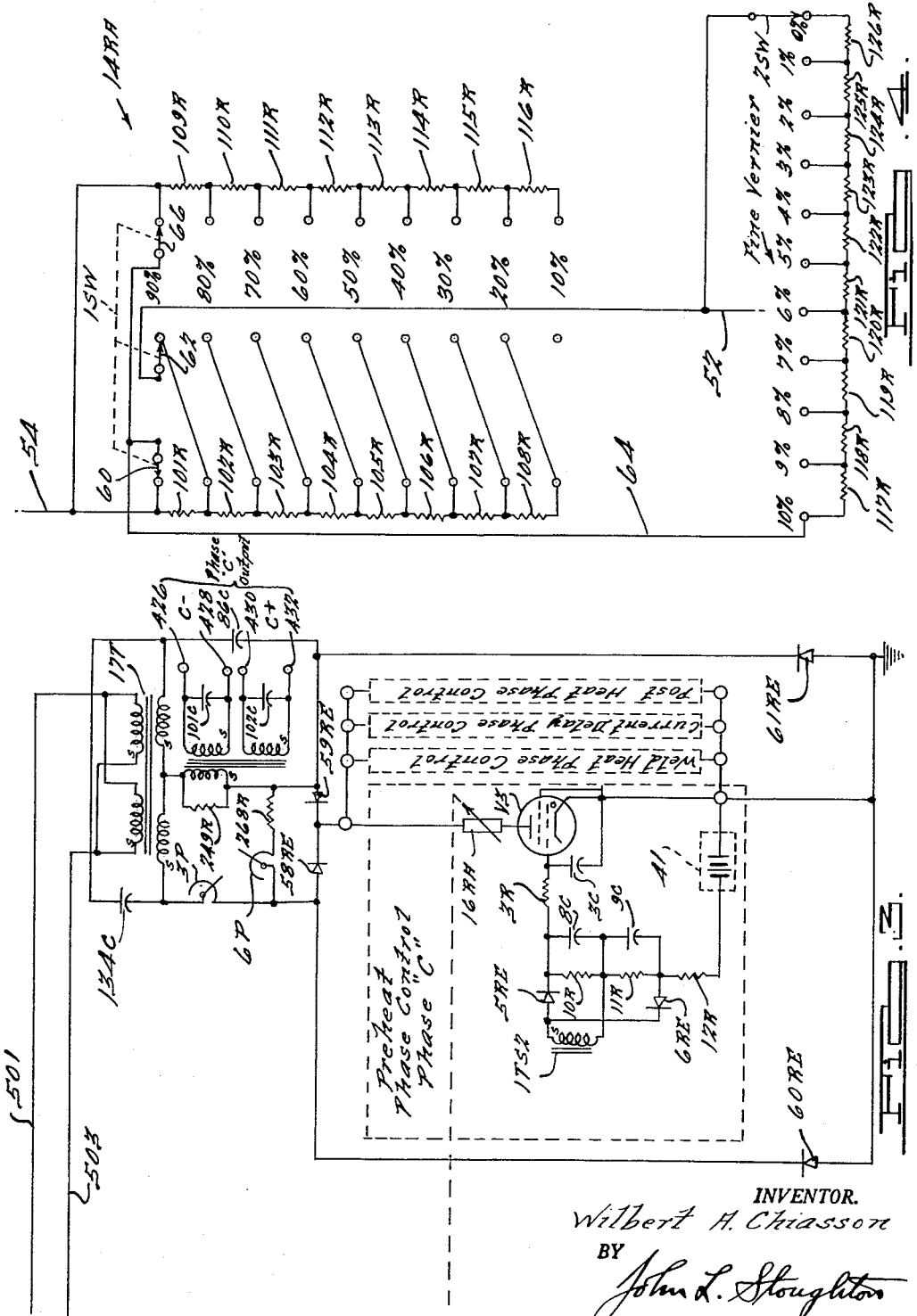
INVENTOR.
Wilbert A. Chiasson
BY John L. Stoughton
HIS ATTORNEY

United States Patent Office 3,045,172
Patented July 17, 1962

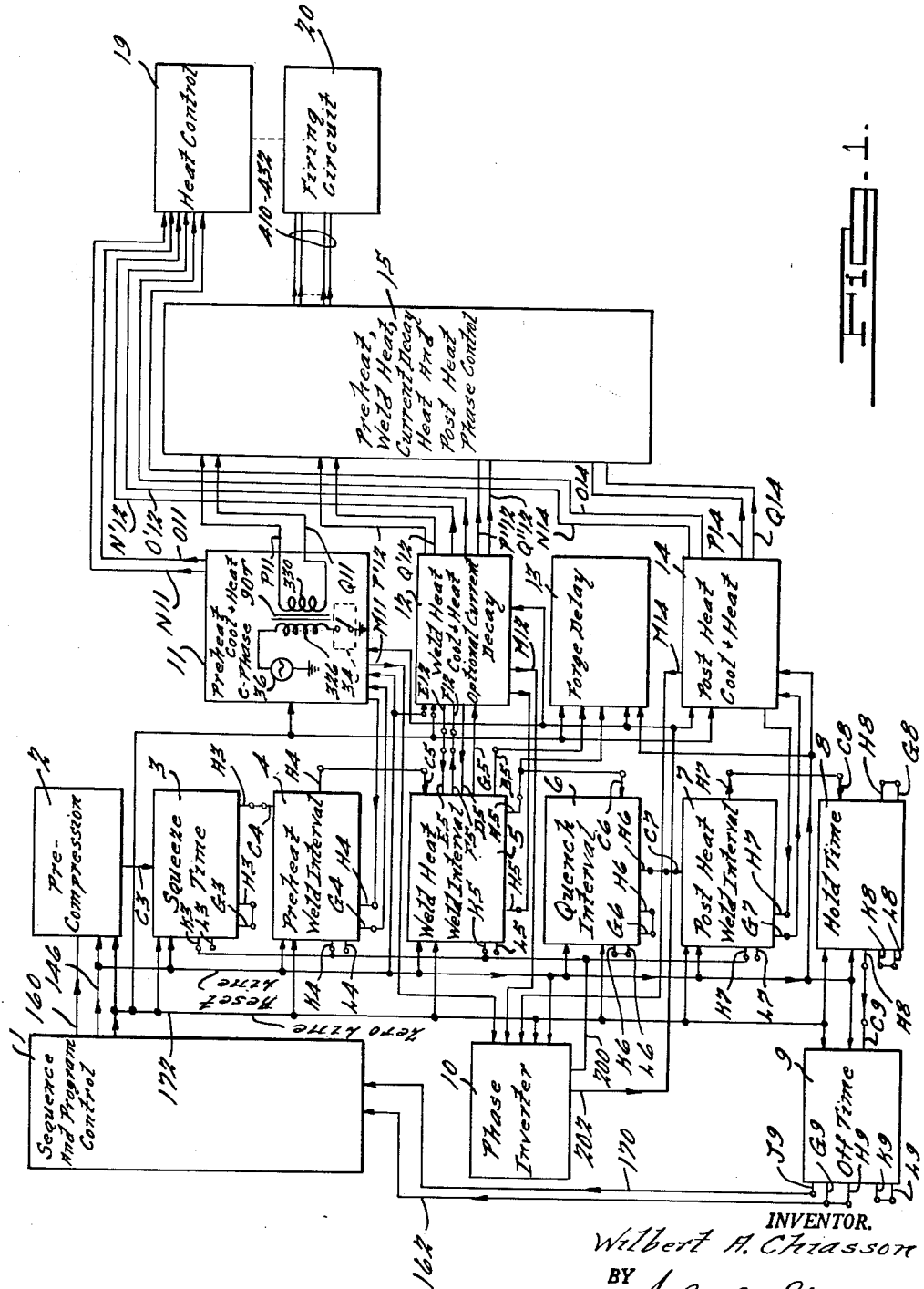

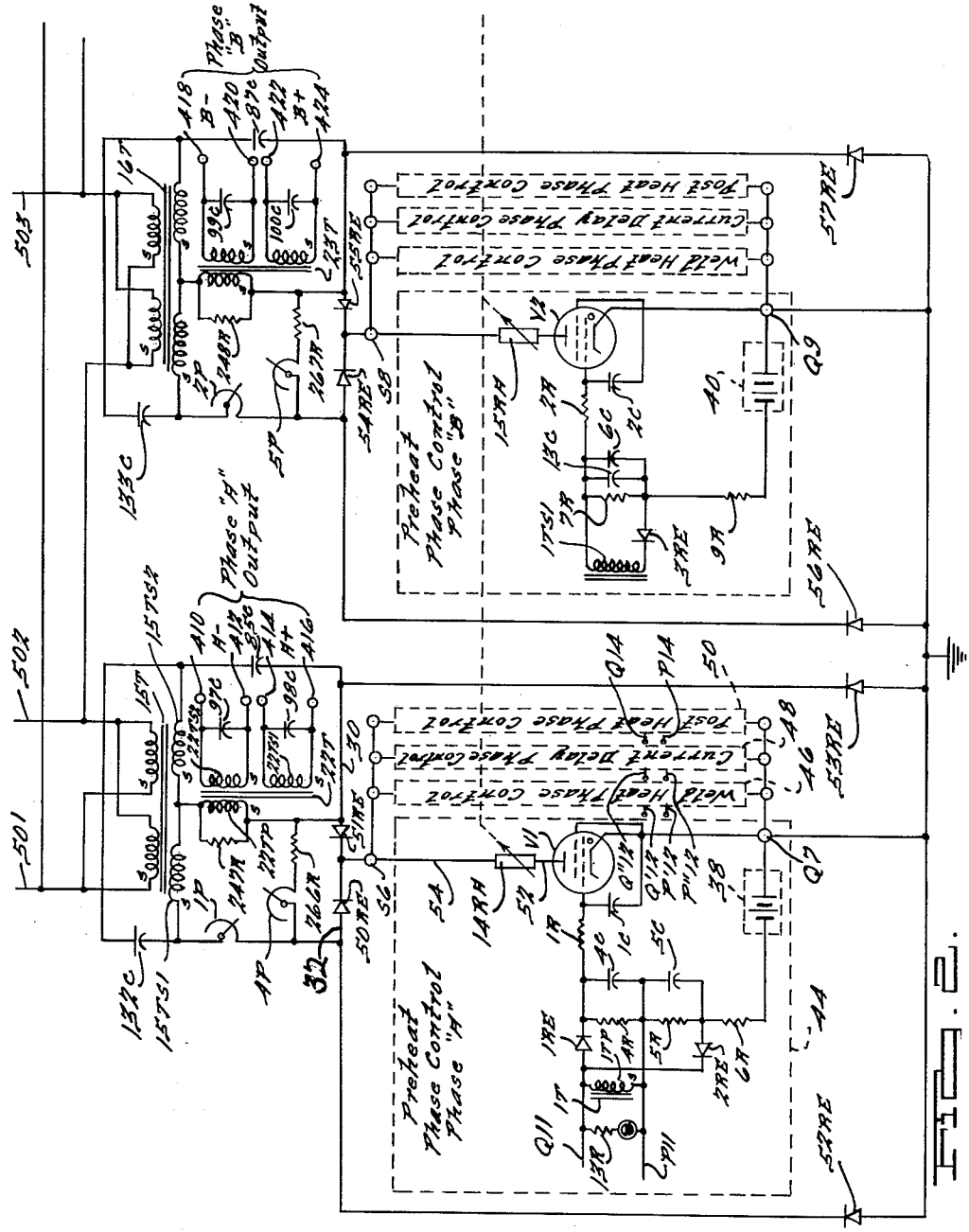

---

3,045,172
PHASE-SHIFTING AND CONTROL APPARATUS
Wilbert A. Chiasson, Commerce Township, Oakland County, Mich., assignor to Weltronic Company, Detroit, Mich., a corporation of Michigan
Filed Nov. 28, 1958, Ser. No. 776,996
16 Claims. (Cl. 323—37)

This invention relates to phase-shifting and control apparatus suitable, for example, to control the operation of a welding machine.

The objects of this invention are to improve the rectilinearity of control of a phase-shifting circuit, to establish a proper balance among a plurality of phase shifters in a polyphase controller, to simplify and improve the development of control voltages for a voltage-responsive phase-shifting circuit, and to insure that the effective action of a phase-shifting circuit is properly initiated and not prematurely terminated.

A feature of this invention is a variable resistance means for use in cooperation with reactive means in a phase-shifting network for applying a phase-shifted voltage to a device responsive to the phase-shifted voltage for controlling the magnitude of a current, such as a welding current, in which the relationship between the value of the variable resistance means and the magnitude of the current is curvilinear, that variable resistance means including a plural position switch for changing the resistance means in different increments to change the value of the current by successive preselected equal amounts as, for example, to change the value of the current in increments of 10%, coupled with single variable resistance vernier means connected to the resistive means for varying the current in sub-increments as, for example, in subincrements of 1%. Since the total resistive value of the vernier means is constant, while the increments of change of the resistive means are not equal to one another due to the aforesaid curvilinear relationship, additional means are provided for adjusting the resistance of the vernier means at each position of the switch to a value which varies in accordance with the size of the next succeeding increment of the resistive means.

Another feature of this invention is an improved calibrating means for use in a phase-shifting network which is adapted to shift the phase of a voltage applied across an output means relative to the phase of a source voltage and including a capacitative branch and a resistive branch, the resistive branch including resistive means (such as an electron discharge device) for varying the amount of the phase shift, the calibrating means including an adjustable resistance means connected in parallel with the variable resistance means so as to adjust the maximum value of resistance in the resistive branch and further including additional adjustable resistance means connected in series with the variable resistance means for adjusting the minimum value of the resistance in the resistive branch.

A further feature of the invention is the provision of such calibrating means in each of a plurality of phase-shifting circuits constituting a polyphase phase shifter so as to achieve balance among the phases at both extremes of the phase-shifting range.

Another feature of this invention is an improved means for applying a direct voltage to the input circuit of an electron valve means which serves as a part of the resistive branch of a phase-shifting circuit, that improved means including a source of controlling alternating voltage related in phase to the energizing alternating voltage, rectifying and filtering means individual to the electron valve means and responsive to the controlling alternating voltage for applying a controlling direct voltage to the input circuit of the valve means, and means for applying an additional biasing direct voltage to the input circuit in series with the controlling direct voltage.

A further feature of the invention resides in the further improvement in which one such phase-shifting circuit is provided for each phase of a polyphase controller and in which the controlling alternating voltage applied to each of the phase shifters leads the anode or energizing voltage applied thereto by a preselected amount, as, for example, the controlling voltage may lead the energizing voltage by from 30 degrees to 150 degrees.

Another feature of this invention is an improved means for delaying termination of the controlling direct voltage applied to the electron valve means following termination of the controlling alternating voltage comprising a filtering network including a capacitor the time constant of the discharging circuit for which is relatively large.

The manner of accomplishing the foregoing objects, the detailed nature of the foregoing features, and other objects and features of the invention will be apparent from the following detailed description of an embodiment of the invention when read with reference to the accompanying drawings in which:

FIGURE 1 is a block schematic representation of a control equipment for a welder in which the principles of the present invention are representatively employed;

FIG. 2 is a schematic representation of a portion of a phase-shifting circuit embodying certain of the principles of the present invention;

FIG. 3 is a schematic representation of another portion of the equipment of FIG. 2 and should be placed to the right of FIG. 2 for proper orientation; and FIG. 4 is a showing of variable resistance means suitable for use in the equipments of FIGS. 2 and 3.

While the phase-shifting circuits which are the subject matter of the present invention are suitable for a variety of uses, they have representatively been illustrated in association with other equipment forming a welder controller and more particularly, they have been illustrated as improvements upon the phase-shifting circuits disclosed in my application Serial No. 711,738, filed January 28, 1958, and entitled "Welding Machine Control Equipment." The disclosure of that patent application is incorporated herein by reference and it is intended to be as much a part hereof as if its drawings and specification had been reproduced fully herein.

FIG. 1 of the present drawings is based upon FIG. 1 of the above noted patent application but is modified therefrom in the designations and interconnections of the phase adjust or phase control and heat control rectangles.

The control circuit diagrammatically illustrated in FIG. 1 of the drawings representatively pertains to a polyphase resistance type spot welder having a welding transformer which is connected to the polyphase source of alternating voltage by means of a pair of ignitrons, connected back-to-back, for each phase, three pairs of ignitrons being provided for the disclosed three-phase welding equipment. A thyratron firing control circuit is provided for each ignitron, one for each half-cycle polarity for each of the phase voltages. A commutation control circuit establishes the sequence of firing of the thyratrons, the A, B and C phase thyratrons of either polarity being fired in sequence. The welding transformer, the ignitrons, the thyratron control circuits and the commutation control circuits constitute the firing circuit 20 in the system of FIG. 1. Suitable circuitry is detailed in FIGS. 17 to 19 of the drawings of my copending application.

A major portion of the remainder of the equipment of the FIG. 1 system serves to control, directly or indirectly, the firing circuit 20. Under that control, the three thyratrons for one welding current polarity are fired in sequence, as, the A-positive, B-positive and C-positive thyratrons. In accordance with the setting of the equipment, this sequence may be repeated a plurality of times during any one heat period.

For each heat period, there is a cool period, during which the magnetization of the transformer can return to zero, and in the disclosed system a cool period precedes each heat period. The cool period as will be seen, may be of selectable duration, and the combination of a cool period and a heat period is here considered to constitute one impulse.

The equipment can be set so that all impulses are of the same polarity, or the equipment can be set for full-cycle operation in which the impulses are of alternating polarities.

The control equipment is designed to additionally control the magnitude of the energy impulses—the percent heat. To this end, a heat control and phase control equipment 15 and 19 on FIG. 1 serves to apply alternating voltage signals to the thyratrons in the firing circuit 20 which are phase-shifted from the respective phase voltages by an amount determined by the setting of the phase control equipment 15.

In the welding of various materials it is desirable that the welding machine be capable of providing different magnitudes of energy pulses at various times during the weld, and consequently the disclosed control equipment can be imbued with the capability of supplying various selectable percentage heats during each of a preheat interval, a weld heat interval, a current decay interval, and a postheat interval, and the phase control equipment 15 can include means for permitting selection of the percentage heats during each of those intervals.

Means are additionally provided for determining the duration of those intervals in terms of numbers of impulses as well as for determining the duration of a delay interval between the current decay interval and the postheat interval, known as quench time, and the duration of a hold time and an off time sequentially following the postheat interval.

As an example, the preheat interval may consist of three impulses at a relatively low percent heat, the weld interval may consist of four impulses of a relatively high percent heat, the current decay interval may be relatively short and with a percent heat setting which is lower than the preheat setting, the quench time is one of zero percent heat, the postheat interval may consist of two impulses of lower percent heat than the weld heat, and the hold time and the heat time may again be at zero current level.

The pressure between the welding electrodes and the work is also variable between zero pressure, squeeze and weld pressure and a higher pressure employed for precompression prior to welding and for forging late in the weld cycle. The durations of the precompression period, of the squeeze interval, and of the forge and forge delay intervals are also selectable and controlled.

In the block schematic representation of FIG. 1 of the drawings, the sequence and program control equipment 1 (the details of which are presented in FIGS. 2 to 4 of the drawings of my copending application) controls and programs the system including the establishing of conditions facilitating the initial setting up of the equipment, the selection of single or cyclic functioning, and the selection of the mode of operation. The sequence and program control equipment 1 transmits, at an appropriate time, a signal to initiate the operation of the forge delay equipment 13 and initiates the seriatim operation of equipments 2 to 9 by transmitting a pulse, at an appropriate time, via conductor 160 to the precompression panel 2, the first of that series. Equipment 1 further operates in response to the receipt of a pulse via conductor 162 transmitted at the termination of the operation of the hold-time unit 8 and a pulse received via conductor 170 at the termination of the operation of the off-time unit 9 to normalize itself and to transmit a zeroing signal and a resetting signal. The zeroing signal is applied as a voltage change to the zero line 172 which extends to the precompression unit 2, the squeeze unit 3, the preheat unit 4, the weld-heat weld-interval unit 5, the quench unit 6, the postheat unit 7, the hold-time unit 8, the off-time unit 9, the preheat unit 11, the weld-heat unit 12, the forge-delay unit 13, and the postheat unit 14, while the resetting signal is applied as a voltage change to the reset line 146 which extends to each of the units 2 through 14. These signals are employed to normalize the equipment at the end of one welding sequence in preparation for the next succeeding sequence.

The control unit 1, when actuated, initiates the sequence of operations by applying an input pulse via conductor 160 to precompression unit 2.

The precompression unit controls the duration of the precompression time (and of the delay after precompression, if any) by counting a selectable number of pulses derived from a clocking signal which is transmitted from a phase inverter unit 10 via conductor 200. This signal is an alternating voltage which is derived from the alternating voltage welding current source. The unit 10 concurrently transmits a clocking signal via conductor 202 to others of the units, those two signals being 180° out of phase with one another. In response to each input pulse via any one of the conductors M11, M12 and M14, the unit 10 inverts the phase of the clocking signal applied to both of the conductors 200 and 202.

The squeeze time or interval unit 3, the preheat weld interval unit 4, the weld-heat weld-interval unit 5, the quench interval unit 6, the postheat weld-interval unit 7, the hold-time unit 8 and the off-time unit 9 are or may be identical to one another except in certain of their internal interconnections and in their connections with the other units in the system. To facilitate this uniformity and interchangeability, each such unit is provided with a plurality of inputs and outputs which are selectively employed in accordance with the system requirements.

Circuitry in the form of a counter suitable for use as any one of the above-noted units 3 to 9, inclusive, is illustrated in FIG. 6 of the drawings of my copending application. Each such unit includes a series of terminal leads designated A to L, inclusive. To facilitate identification, these terminal leads, in the representation of FIG. 1, are suffixed with the same number as the block of which they are a part.

The counter unit is characterized as a 100-count unit, since it operates as a counter capable of transmitting an output signal after the receipt of a series of input signal pulses which may be varied in number from 0 to 99 in the illustrated arrangement. When the squeeze time unit 3 has completed the counting of a selected number of half waves of one polarity of the clocking signal, it transmits an output pulse via terminal leads A3 and C4 to initiate operation of the preheat weld interval unit 4. This unit immediately transmits a signal via terminal lead G4 to the preheat cool and heat unit 11 which may be of the type detailed in FIG. 10 of the drawings of my copending application. In response to the input signal, unit 11 counts a selectable number of pulses derived from the clocking signal at conductor 202 to establish the first cool period of the preheat interval. At the completion of the count, the preheat cool and heat unit 10, transmits signals via leads P11 and Q11 to the preheat section of the phase control unit 15 (detailed in FIGS. 2–4 hereof) to cause that unit to transmit phase-shifted voltages to the firing circuit via conductors 410—432 to control the firing of the firing control thyratrons therein in accordance with a selected percent heat. The unit 10 further transmits, at the end of the cool-period count, signals via conductors N11 and O11 to the unit 19 to initiate operation of that unit. Heat controller 19 exerts control over the firing circuit 20 (detailed in FIGS. 17 to 19 of my copending application) to cause the commutation circuits in unit 20 to fire the A, B and C firing control thyratrons (for one polarity) in sequence. The number of such sequences which will occur is determined by the preheat cool and heat unit 11, that unit counting one clocking-signal-derived pulse for each such sequence. When the preselected number of heat-period pulses have been counted by unit 11, the signals applied to leads P11, Q11, N11 and O11 are terminated to terminate energization of the welding transformer, the counter in unit 11 is reset in preparation for the counting of pulses to define the duration of the next cool period, and a pulse is transmitted via conductor H4 to the preheat weld interval unit 4. Unit 4 counts that pulse to record the completion of one preheat weld impulse. At this same time, unit 11 applies a pulse to lead M11 to cause the phase inverter 10 to invert the phase of the clocking voltages on conductors 200 and 202.

The equipment continues to produce and count those impulses until unit 4 has counted a preselected number of the input pulses on lead H4. At that time, the signal applied to lead G4 is terminated to prevent further operation of unit 11, unit 4 is reset, and a pulse is transmitted via terminal leads A4 and C5 to initiate the operation of the weld-heat weld-interval unit 5.

When unit 5 is actuated, it transmits a signal via terminal lead G5 to the weld heat cool and heat unit 12 which is herein assumed to be capable of providing, optionally, current decay at the end of the last impulse. Unit 12 operates in a manner generally similar to unit 11, counting pulses derived from the clocking signal on conductor 202 to define the successive cool and heat periods, and transmitting control signals to the weld heat phase adjust portion of unit 16 via leads P'12 and Q'12 and to the heat controller 19 via leads N'12 and O'12. If the current decay capability of unit 12 is disabled, unit 12 transmits a pulse to unit 5 via lead H5 at the end of each heat period so that unit 5 can count the number of welding impulses during the weld interval. Additionally at the end of each heat period (except for the last heat period) unit 12 transmits a signal via conductor M12 to cause the phase inverter 10 to invert the phase of the clocking signals.

If the current decay capability of the unit 12 is utilized, the pulse to be counted is transmitted to unit 5 via conductor H5 not at the end of the heat period but rather at the end of the cool period. Consequently, unit 5 reaches its count at the end of the cool period of the last weld impulse and transmits a signal via lead F5 to unit 12. In response to that signal, unit 12 prepares to count out the current decay period and becomes disabled to transmit a pulse to the phase inverter at the end of the last heat period. This insures that the polarity of the current decay will be the same as the polarity of the last welding current impulse in the weld heat interval.

At the completion of the final heat period of the weld interval, unit 12 terminates the signal on output leads P'12 and Q'12 and transmits a signal via leads P''12 and Q''12 so that the percent heat during current decay will be determined by the setting of the current decay heat phase adjuster portion of the phase controller 16. At the end of the current decay, unit 12 resets itself, transmits a pulse via lead M12 to trip the phase inverter 10, and transmits a signal via lead E5 to terminate operation of unit 5.

The initiation of the operation of the forge delay unit 13 may occur at the beginning of the weld interval count (in response to a signal applied via lead B5), or at the end of the current decay following weld heat (in response to a signal applied via lead A5) or, if desired, at the beginning of current decay. The duration of the forge delay time is determined by counting pulses derived from the clocking voltage on conductor 202 and by means for measuring a selected portion of one interpulse period. Unit 13 controls the welding machine equipment which establishes the force of engagement between the welding electrodes and the work.

At the end of the weld interval (with or without current decay) a signal is also transmitted to the quench time counter 6 via leads A5 and C6. This unit times the quench interval by counting pulses derived from the clocking signal on conductor 200 and, after having counted a selected number of pulses, initiates the operation of the postheat weld interval unit 7 by applying a signal thereto via leads A6 and C7.

Unit 7 co-operates with the postheat cool and heat unit 14 in a manner similar to that above noted in connection with units 4 and 11, and unit 14 controls the percent heat and the durations of the cool and heat periods by transmitting control signals to the heat controller 19 over leads N14 and O14 and to the postheat phase adjuster 18 via leads P14 and Q14.

At the end of the postheat weld interval, unit 7 trips unit 8 to count the hold time and that unit in turn trips unit 9 to count the off time. Unit 9 exerts control over the sequence and program control panel 1 by transmitting signals via conductors 162 and 170.

For clarity of presentation and to avoid unnecessary complication of the drawings, the circuit elements have been functionally located on the several sheets of drawings. Similarly, the primary and secondary windings of certain of the illustrated transformers are identified with the same reference characters except that the reference characters applied to the primaries also include the letter "P" and those applied to the secondaries include the letter "S." In any one transformer, the starting ends of all windings are marked with a small "s" to illustrate the phase relationships. Rectifiers or unidirectional current conducting devices are represented with their arrows pointing in the direction of low impedance to conventional current flow. In most cases, both the alternating and the direct potential sources have been represented as identified circles.

The heat control unit shown on FIGS. 2 and 3 of the drawings is energized from a three-phase source of alternating voltage connected to conductors 501, 502 and 503. The voltage appearing between conductors 501 and 502 will be identified as the A phase, the voltage appearing between conductors 502 and 503 will be identified as the B phase, and the voltage appearing between conductors 503 and 501 will be identified as the C phase. This three-phase alternating voltage is also applied, under the control of a plurality of ignitrons, to the primary winding of the welding transformer and the ignitrons are in turn controlled by a group of thyratrons, one thyratron being provided individual to each ignitron, as is illustrated in FIGS. 18 and 19 of my above-identified copending application. Three of the thyratrons are fired during the positive half cycles of the A, B and C phases, respectively, to actuate their corresponding ignitrons, and the remaining three thyratrons (assuming full cycle operation) are fired during the negative half cycle of the A, B and C phases to actuate their corresponding ignitrons. The sequence of firing of the thyratrons and the number of such sequences of each polarity before a sequence of the opposite polarity is initiated are controlled by units 11, 12 and 14 of FIG. 1 through control conductors N11, O11, N'12, O'12, N14 and O14, by positive and negative control circuits in the heat control unit 19 and by commutation control circuits, in the firing circuit 20. The circuits of FIGS. 2 and 3 control the firing angle of the thyratrons so as to control the percent heat by applying to the input circuit of each individual thyratron an alternating voltage which lags the plate voltage applied to that thyratron by an adjustable angle. The A phase controller including tube 1V (FIG. 2) is energized from the A phase of the source and applies a controlling alternating voltage via conductors 414 and 416 to the A positive thyratron (the anode circuit of which is energized by the A phase of the supply voltage) and applies a controlling alternating voltage via conductors 410 and 412 to the A negative thyratron in the firing circuit (the anode of which is energized from the inverted A phase of the supply voltage). Thus, as is illustrated in my above-identified copending application, conductor 414 may be connected to the cathode of the A positive thyratron and conductor 416 may be connected through an individual unidirectional current conducting device to the control grid of that thyratron.

Similarly, the B phase phase-control circuit including tube 2V applies an alternating voltage which lags the B positive voltage by an adjustable amount via conductors 422 and 424 to the B positive firing control thyratron and applies a voltage inverted therefrom via conductors 418 and 420 to the B negative firing control thyratron, and the C phase phase-controlling circuit including tube 3V (FIG. 3) supplies phase-shifted voltages to the C positive thyratron via conductors 430 and 432 and to the C negative thyratron via conductors 426 and 428. In the arrangement disclosed in my copending application, conductors 414, 412, 422, 420, 430, and 428 are connected to the cathodes of the respective thyratrons while the other conductor of each pair is connected through an individual rectifier to the control grid of the respective thyratron.

In general the illustrated phase shifter for the A phase comprises a transformer 15T the primary of which is connected across the A phase and between conductors 501 and 502, and having two secondary windings 15TS1 and 15TS2. The output or load device in the form of the primary winding 22TP of transformer 22T is energized from the source through a reactive branch (here capacitative) including capacitor 85C and a resistive branch including variable resistance means effectively connected between conductors 30 and 32 and comprising electronic valve means including an adjustable plate load resistor. In the illustrated arrangement, the reactive branch has a fixed value of reactance and the amount of phase shift is controlled by varying the effective resistance in the resistive branch.

It will be observed that the left-hand terminals of each of the windings of transformer 15T have been marked with the designation "S" (denoting the "start end" of the winding). For purposes of analysis of the polarities, those ends of the transformer windings may be considered to be interconnected. Under the assumption that, as an instantaneous condition, the left-hand terminals of the two primaries of transformer 15T are positive relative to the right-hand terminals of those primary windings, the left-hand terminal of secondary 15TS1 and the left-hand terminal of secondary winding 15TS2 will both be positive relative to their right-hand terminals. The left-hand terminal of transformer secondary 15TS1 is connected to the anode of tube 1V through rectifier 50RE and through plate resistor 14RA and is connected to the cathode of the 1V through rectifier 52RE, while the right-hand terminal of transformer secondary 15TS1 is connected through the primary winding of transformer 22T, through rectifier 51RE and through resistor 14RA to the anode of tube 1V, and is connected to the cathode of that tube through rectifier 53RE.

Assuming tube 1V to be conductive as a result of the application of an appropriate potential difference between its control grid and cathode in a manner to be described, under the illustrated instantaneous conditions, conventional current will flow from the left-hand terminal of secondary 15TS1, through unidirectional current conducting device or rectifier 50RE (which is poled for low impedance to conventional current flow in the direction of its arrow), through resistor 14RA, through the anode-cathode path in tube 1V, through rectifier 53RE, primary winding 22TP of transformer 22T, and back to the right-hand terminal of secondary 15TS1. As a result of this current flow, a voltage will be developed across the primary winding of transformer 22T of an instantaneous polarity such that the lower terminal thereof is positive relative to the upper terminal, which will result in the induction of correspondingly poled potentials in the secondary windings of that transformer.

At the opposite half-cycle of the "A" phase signal, conventional current will flow from the right-hand terminal of transformer 15TS1, through primary winding 22T, rectifier 51RE, resistor 14RA, through the anode-cathode path of tube 1V, rectifier 52RE, and back to the left-hand terminal of transformer secondary 15TS1, reversing the polarity of the voltage across the primary winding of transformer 22T and resulting in a reversal of the voltages induced in the secondary windings of that transformer. It is important to observe that the current flow during both half-waves of the "A" phase signal is through the same tube 1V so that the resistance offered to that current flow will be constant and equal during both half-cycles of the applied alternating voltage. While different pairs of the rectifiers 51RE—52RE and 50RE—53RE are employed during the two half-cycles, such rectifiers do not normally vary greatly in their forward resistance and, in any event, their forward resistance is so small relative to the effective plate resistance of tube 1V that variations in their forward resistances will not produce a significant variation in the current flow during the two-half-cycles of the supplied alternating current.

When the left-hand terminal of secondary winding 15TS2 is positive relative to the right-hand terminal of that secondary, conventional current will flow from the left-hand terminal, through the primary winding of transformer 22T, and through a reactive means in the form of capacitor 85C, and back to the right-hand terminal of secondary 15TS2, and a reverse current flow will occur during the opposite half-cycle of the applied "A" phase alternating voltage. This signal through the primary winding of transformer 22T is phase shifted, by the action of capacitor 85C, 90 degrees with respect to the current through that primary winding and through the electron valve means including resistor 14RA, which acts as the resistive component of the phase-shifting apparatus. The effective output signal, therefore, will be shifted in phase in relation to the "A" phase supply voltage by an amount determined primarily by the resistance of resistor 14RA. This phase-shifted voltage is developed across the secondary windings of transformer 22T so that it appears between terminal leads 410 and 412 and between terminal leads 414 and 416.

Transient suppressing capacitors 132C, 97C and 98C are shown connected across the secondaries of transformers 15T and 22T.

It will be observed that by virtue of the establishment of a common path through tube 1V for both half waves of the alternating voltage, the two half-cycle currents will be closely identical so that the amount of the effective phase shift of the signal at the output terminals 410 to 416 will be equal on the two half cycles so as to contribute to the establishment of balanced positive and negative half-cycle currents in the welding transformer.

In a similar fashion, and alternating voltage is developed between terminal leads 418 and 420 and between terminal leads 422 and 424 which is phase-shifted from the "B" phase voltage by an amount determined primarily by the setting of resistor 15RA and an alternating signal is developed between terminal leads 426 and 428 and between terminal leads 430 and 432 which is phase-shifted from the "C" phase voltage by an amount determined primarily by the setting of resistor 16RA.

Tube 1V is, in the illustrated arrangement, assumed to be a part of an electron valve means individual to the preheat phase control and serving to control the heat during each A phase of the preheat weld intervals, and tubes 2V and 3V are assumed to be a part of electron valve means for controlling the magnitude of the B and C phase currents during the weld portions of the preheat intervals. Accordingly, the discharge from tube 1V is initiated under the control of the preheat cool and heat unit 11 shown in FIG. 1 of the drawings which serves to apply, during appropriate intervals, an alternating voltage to the electron valve means including tube 1V to produce that discharge. As is shown in FIG. 1, the alternating voltage is applied from unit 11 to unit 15 via conductors P11 and Q11 which are connected to the terminals of secondary winding 33Ø of transformer 9ØT in unit 11. An alternating voltage is induced in secondary winding 33Ø from primary winding 326 when the circuit for the primary winding 326 is closed. For convenience of illustration, the energizing circuit for primary winding 326 has been shown as including a switch 34 which is periodically closed (during the preheat interval) by the apparatus in rectangle 11. As is detailedly set forth in my above-identified copending application, element 34 may, for example, be a thyratron, and the circuit of rectangle 11 may be that detailedly disclosed in my above-identified application except for the deletion of the rectifiers there shown in conductors P11 and Q11.

When switch means 34 is closed, the primary winding 326 of transformer 9ØT is energized from a source 36 of "C" phase voltage. Switch means 34 can, for example, serve to connect primary winding 326 to conductors 5Ø3 and 5Ø1 (FIGS. 2 and 3), or, if desired, and preferably, primary winding 326 may be energized from conductor 2Ø2 so as to be supplied with a C phase voltage which is inverted in phase in a systematic fashion in accordance with whether the "positive" thyratrons or "negative" thyratrons in the firing control circuit are to be fired, as detailed in my above-identified copending application.

When a C phase voltage appears between conductors P11 and Q11, it is rectified and filtered and applied in series with a biasing voltage between the control grid and cathode of thyratron 1V to cause that thyratron to fire. During the half cycle of the C phase voltage during which conductor Q11 is positive relative to conductor P11, current flows through rectifier or unidirectional current conducting device 1RE, through capacitor 4C (paralleled by resistor 4R) and to conductor P11 to charge capacitor 4C with its upper electrode positive relative to its lower electrode. During the opposite half cycle of the applied alternating voltage, capacitor 4C tends to discharge through resistor 4R. However, the time constant of the circuit including capacitor 4C and resistor 4R is selected to be sufficiently large to provide adequate filtering or integrating action, as, for example, capacitor 4C may have a value of 0.2 microfarad and resistor 4R may have a value of 100,000 ohms.

In the half cycle of the applied voltage during which conductor P11 is positive relative to conductor Q11, current flows from conductor P11 through capacitor 5C (paralleled by resistor 5R), through unidirectional current conducting device 2RE and to conductor Q11, charging capacitor 5C with its upper electrode positive relative to its lower electrode. Again, capacitor 5C tends to discharge through resistor 5R during the other half cycle of the applied alternating voltage but its time constant is again selected to prevent complete discharge during this period. Capacitors 4C and 5C are serially connected in the input circuit of thyratron 1V, that circuit being traced from the control grid of thyratron 1V, through resistor 1R, capacitor 4C, capacitor 5C, resistor 6R, bias battery 38 (symbolic of any source of biasing voltage) and to the grounded cathode of tube 1V. Biasing battery 38 normally holds tube 1V nonconductive, but upon the application of an alternating voltage between conductors Q11 and P11, capacitors 4C and 5C are charged to produce a positive potential difference thereacross which initiates discharge in tube 1V. It will be observed that the network including rectifiers 1RE and 2RE and capacitors 4C and 5C is connected as a full-wave rectifier and voltage doubler.

With tube 1V nonconductive, the phase-shifting circuit has a maximum resistance in its resistive branch and produces a maximum phase shift and hence a low heat. It is desirable that the operation of the phase-shifting circuit during each weld interval be initiated sufficiently early so that the correct phase-shifted voltage will be applied to the A phase thyratron firing control tubes during the first cycle of their operation. To this end, the alternating voltage applied between conductors Q11 and P11 preferably leads the A phase so that a firing potential will be applied between the control grid and cathode of tube 1V slightly prior to the time that the anode voltage of tube 1V (supplied from the A phase) rises to the point where discharge can occur. This is accomplished by employing a C phase voltage as the input signal, that C phase voltage leading the A phase voltage by 120 degrees. To then insure that the critical grid voltage will be maintained at the final cycle of operation of the firing control thyratrons, the time constants of the filter networks are selected, as above discussed, to hold that applied grid voltage for the requisite interval (approaching 120 degrees).

The alternating voltage applied between conductors Q11 and P11 is also developed across primary winding 1TP of transformer 1T which is provided with a secondary winding 1TS1 in the input circuit to thyratron 2V and with a secondary winding 1TS2 in the input circuit to thyratron 3V.

The alternating voltage appearing across secondary 1TS1 is half-wave rectified and filtered by means including capacitors 6C and 13C and resistor 7R (all connected in parallel with one another) and rectifier 3RE, that rectifier being poled so that the upper terminals of capacitors 6C and 13C are positive relative to the lower terminals. The direct voltage across capacitors 6C and 13C is applied to the input circuit of tube 2V, that input circuit further including grid-current-limiting resistor 2R, resistor 9R, and bias voltage 4Ø.

The alternating voltage developed across secondary 1TS2 is full-wave rectified by a voltage doubling circuit similar to that previously described in connection with the A phase controller including tube 1V.

Heat adjusting means may be provided during each of the preheat, weld heat, current decay, and post heat intervals. While all of the circuitry shown in FIGS. 2 and 3 may be duplicated for each of these intervals, in the preferred arrangement only the electron valve means (including its load resistor and input circuit) is duplicated. Thus, the electron valve means including tube 1V and enclosed in rectangle 44 in FIG. 2 is individual to the preheat phase control of phase A. Similar such equipment adapted to adjust the weld heat phase shift may be connected in parallel therewith as is indicated by rectangle 46, and current decay phase control 48 and post heat phase control 5Ø may also be connected in parallel therewith as indicated. The actuation of the weld heat phase control is controlled by the application of an alternating voltage via conductors Q'12 and P'12 from the weld-heat cool-and-heat unit 12 in FIG. 1, the current decay phase control is actuated by the application of an alternating voltage between conductors Q"12 and P"12 from that same unit and the actuation of the post heat phase control unit 5Ø is controlled by the application of an alternating voltage between conductors Q14 and P14 through the post-heat cool-and-heat panel 14. Correlative B phase and C phase units are also provided.

When the full capabilities of the equipment are employed so that the preheat phase control, the weld heat phase control, the current decay phase control and the post heat phase control are used in succession, the requirements for the characteristics of the input circuits of the thyratrons 1V, 2V and 3V and of their counterparts in the other phase control circuits become relatively critical. It is desirable that the enabling direct voltage be applied prior to or early in the applied positive half wave of plate voltage to insure that the heat setting is not artificially low on the first cycle and to avoid transient disturbances. It is desirable that the applied direct voltage be adequately filtered so that the magnitude of the ripple voltage applied to the grid is not large enough to produce a change in the plate current. It is desirable that at the last half cycle of operation of each of the tubes, the direct voltage applied to the grid be maintained to a point adequately late in the applied half cycle of the plate voltage to insure full heat in accordance with the setting of the plate load resistor. Yet it is desirable that the direct voltage applied to the control grid terminate promptly the end of that half cycle to insure that two of the phase controllers for any one phase are not concurrently operated for if they are, the resistive branch of the phase-shift circuit in essence includes two resistances in parallel and hence a too-high heat condition will exist momentarily. In the illustrated preferred arrangement, these conditions are met by employing a C phase voltage for the control signal coupled with full-wave rectification in the A phase and C phase units. In the A phase unit, the first applied half wave of the C phase voltage (regardless of its polarity) will have developed a sufficient direct voltage across capacitor 4C or 5C to enable tube 1V to fire on the next half cycle of the applied plate voltage. This is true at each half cycle of the A phase voltage since tube 1V is connected in a full-wave bridge comprising rectifiers 50RE—53RE. The effective full-wave rectification of the input alternating voltage signal permits a reduction of the time constant of each of the networks 4R—4C and 5R—5C, it being observed that the ripple frequency is effectively 120 cycles per second. Hence, while the time constant is sufficiently large to both insure adequate reduction in the magnitude of the ripple voltage and to insure that the direct voltage will be held upon the grid (following termination of the applied alternating control signal) for or substantially for the duration of the half cycle of applied plate voltage, the time constant can be small enough so that tube 1V will not remain operated into the next half cycle of voltage and hence cannot operate concurrently with the counterpart tube in the weld heat phase controller 46, and the same considerations apply with respect to the successive operations of units 46, 48 and 50.

With respect to the C phase controller the same considerations apply except that it will be observed that the input signal and the plate voltage are in phase, both voltages being derived from full-wave rectification of the C phase voltage. In a practical embodiment of the invention, resistors 4R, 5R, 10R and 11R were selected at 100,000 ohms and capacitors 4C, 5C, 8C and 9C were each 0.2 microfarad.

To avoid transient disturbances in the operation of the B phase controller including tube 2V, it is preferred that secondary 1TS1 be connected so that at the first half cycle of applied C phase voltage the voltage at the upper end of that secondary winding is negative relative to the voltage at the lower end of that winding, that the signal be but half-wave rectified, and that rectifier 3RE be poled so that no direct voltage will be developed across capacitors 3C and 6C during this first half cycle of applied C phase voltage. At the second half cycle of applied C phase voltage, capacitors 3C and 6C will charge in a direction to apply a positive potential to the grid of tube 2V relative to the cathode so that at the second half cycle of the full-wave rectified B phase plate voltage thyratron 2V will fire. It is desirable that the applied C phase voltage across winding 1TS1 be derived from the clocking voltage signal on conductor 202 (as described in detail in the aforesaid copending application) so that the applied C phase voltage will be shifted 180 degrees each time that the firing control circuits are shifted between negative and positive operation.

In the aforesaid constructed arrangement, the time constants were found to be proper if capacitor 6C had a value of 0.02 microfarad, capacitor 13C had a value of 0.05 microfarad and resistor 7R had a value of 75,000 ohms.

It will be recognized that the voltage compensating circuits disclosed in the aforesaid copending application may be employed in association with the circuits of FIGS. 2 and 3 of the subject application if desired.

Adjustment of the percent heat in each of the phases and during each of the preheat, weld heat, current decay, and post heat intervals is accomplished through adjustment of the plate load resistors including resistors 14RA, 15RA and 16RA in the preheat phase control circuits and the counterpart resistors in the other phase control circuits. For convenience of manipulation, variable resistors 14RA, 15RA and 16RA are preferably ganged. To permit calibration of the equipment and to permit balancing of the several phases at both the low heat and the high heat ends of the range of heat variation, variable resistors 1P and 4P and resistor 266R are connected in the resistive branch of the A phase controller and corresponding elements are provided for the other two phases.

The resistance presented to the resistive branch of the A phase shifter by tube 1V and plate resistor 14RA effectively appears between conductors 30 and 32, as above noted. Serially interconnected resistor 266R and variable resistor 4P are effectively connected in parallel with that variable resistance since they are connected between conductors 30 and 32, and variable resistor 1P is connected in series therewith. At low heat settings, when the resistance of resistor 14RA is maximum, the resistance of variable resistor 1P is small relative to the effective resistance of resistor 14RA so that variation of resistor 1P will produce no significant change in the amount of phase shift. However, variable resistor 4P and its serially interconnected fixed resistor 266R are effectively connected in parallel with resistor 14RA and hence variation of resistor 4P can produce an appreciable change in the phase shift at the low heat position. Accordingly, resistors 4P, 5P and 6P are adjusted at the low heat setting of resistors 14RA to 16RA to establish balance among the phases. At the high heat setting of resistors 14RA to 16RA, their effective resistance is low relative to the effective resistance of the serially interconnected pairs of resistances 4P—266R, 5P—267R and 6P—268R so that the instant setting of variable resistors 4P, 5P and 6P will not substantially vary the phase shift among the several phase-shifting circuits. However, variable resistors 1P, 2P and 3P act in series with variable resistors 14RA, 15RA and 16RA, respectively, so that variation in the setting of those variable resistors will produce an appreciable effect upon the amount of phase shift and permit calibration and balancing of the three-phase shifting circuits at the high heat setting.

In commercial practice, it is desirable that the load resistors 14RA—16RA be adjustable in finite steps to insure accuracy of setting and accurate reproduction of prior settings. Desirably, these steps are in increments of 1% change in welding current at least over the major portion of the heat adjust range. To permit variation in increments of 1% from, say, 20% to 100% heat would require an 80-point switch for each of the units 14RA, 15RA and 16RA. In the preferred arrangement, each of the plate load variable resistors, as variable resistor 14RA, takes the form of a "coarse" switch for adjusting the welding current in 10% increments as from 10% through 90% coupled with a fine vernier 11-point switch adjustable in 1% increments from 0% to 10% to permit selection of subincrements of the current within each of the coarse settings. The preferred arrangement is illustrated in FIG. 4 of the drawings, the entire figure representing variable resistor 14RA of FIG. 2 with the connecting leads 52 and 54 being designated on both figures.

The gross setting switch 1SW (which will normally be ganged with corresponding switches for the B and C phases) is a 9-position 3-pole switch. At the 90% position of switch 1SW, pole 60 is directly connected to conductor 54 and as pole 60 is moved successively from the 90% position increment by increment to the 10% position, it successively is connected to the lower terminal of each of a group of serially interconnected resistors 101R to 108R. For example, at the 60% setting of switch 1SW, pole 60 in connected through serially interconnected resistors 103R, 102R and 101R to conductor 54.

Pole 62 of switch 1SW is, at each of its positions, connected to conductor 54 through those of the resistors 101R—108R which are at that position connected in circuit by pole 60 plus the next succeeding one of those resistors. Thus, for example, at the aforesaid 60% position of switch 1SW in which pole 60 is connected to conductor 54 through resistors 103R, 102R and 101R, pole 62 is connected to conductor 54 through serially interconnected resistors 104R, 103R, 102R and 101R. Otherwise stated, at each position of switch 1SW, pole 62 is connected to pole 60 through the next succeeding one of the resistors 101—108R.

Pole 62 is connected to lead 52 (and hence to the anode of thyratron 1V) and to the movable element of switch 2SW. Switch 2SW is an element of the fine vernier control further including a series of serially interconnected resistors 117R to 126R and a contact element, engageable by the movable element of switch 2SW connected to the left-hand terminal of each of those resistors. The left-hand terminal of resistor 117R, and the switch contact thereat, are connected by a conductor 64 to pole 60 as well as to a third pole 66 of switch 1SW, pole 66 being ganged with poles 60 and 62. The movable element of pole 66 is successively engageable with a plurality of electrical contacts which are connected to the terminals of a plurality of serially interconnected resistors 109R through 116R. As pole 66 is moved downwardly step by step in coordination with poles 60 and 62, it adds one of the resistors 109R to 116R to the preceding ones of that group of resistors in the connection between conductors 64 and 54.

The successive combinations of resistors 101R to 108R constitute the primary coarse adjustment resistors and the successive combinations of resistors 117R to 126R constitute the primary fine vernier resistors. Resistors 117R to 126R are connected in selected combinations in series with the selected combinations of primary coarse resistors 101R to 108R to obtain a given setting.

At each position of pole 60 of switch 1SW, a selected number (which may be zero) of the resistors 101R to 108R are connected in series between conductors 64 and 54. Movement of that pole to the next lower position adds the next succeeding one of those resistors to the series combination and reduces the percent heat by 10%. For the fine vernier to be correct, the total value of the fine vernier resistance, that is, the sum of the resistances of resistors 117R to 126R, must equal the value of the next succeeding gross resistor. However, the relationship between the resistance in the path between conductors 52 and 54 and the current through the ignitrons in the firing circuit is curvilinear rather than rectilinear so that the resistance which must be added in that circuit to change the current by 10% will vary over the range of adjustment. Thus, in one installation it was found that with resistance 14RA set (at zero ohms) to produce 100% heat, resistance 14RA should have a value of 417 ohms to produce 90% heat, 902 ohms to produce 80% heat, 1319 ohms to produce 70% heat, 1925 ohms to produce 60% heat and 2541 ohms to produce 50% heat, etc. Therefore, the increment of resistance which is added to the gross setting resistors to produce a 10% change in the current will vary from setting to setting and the overall resistance of the fine vernier must also correspondingly vary if the fine vernier overall resistance is to represent 10% change in current at each and all of the coarse resistance settings.

In the disclosed arrangement, the overall resistance of the fine vernier resistors is adjusted at each setting of the coarse switch 1SW by connecting the next succeeding one of the resistors 101R to 108R in parallel with the fine vernier. It was found in the aforesaid practical arrangement that the accurate modification of the overall resistance of the fine vernier was facilitated by employing primary coarse resistors 101R to 108R having values larger than required for the proper coarse resistance and connecting in parallel therewith selected ones of the resistors 109R to 116R. Thus, at each setting of switch 1SW, the selected group of the resistors 101R—108R is connected in parallel with the corresponding selected number of resistors 109R—116R, and this parallel network is connected in series with another parallel network comprising a selected number of the fine vernier resistors 117R—126R and, in parallel therewith, the next succeeding one of the primary coarse resistors 101R—108R.

In the above-noted practical arrangement, resistors 117R—126R were selected to have values of 75 ohms, 75 ohms, 100 ohms, 100 ohms, 125 ohms, 225 ohms, 250 ohms, 250 ohms, 400 ohms and 900 ohms, respectively, for a total fine vernier resistance of 2500 ohms. With the coarse switch 1SW set at the 90% position and the vernier set at the 10% position (to produce a 100% effective heat), there is zero ohms resistance between conductor 52 and conductor 54 since the fine vernier resistance is zero and since the poles 60 and 66 are both directly connected to conductor 54. At the 90% setting of the coarse switch 1SW and at the 0% setting of fine switch 2SW, the total resistance between conductors 52 and 54 consists of resistor 1R (connected via pole 62) and the total fine vernier resistance in parallel with one another. With resistor 101R having a value of 500 ohms and the total fine vernier resistance being 2500 ohms, the total effective resistance between conductors 52 and 54 is 417 ohms. The same resistance should be presented in this circuit if the coarse switch 1SW is moved to the 80% position and the vernier switch 2SW is moved to the 10% position. In these positions of the switches, the vernier resistance is zero so that the resistance presented by the parallel circuit of the fine vernier resistance and resistor 102R in parallel therewith (resistor 2R having a value of 600 ohms) is still zero ohms. Therefore, the only effective resistance in the circuit is resistor 101R (500 ohms) shunted by resistor 109R (2500 ohms) to present a total resistance between conductor 52 and 54 of 417 ohms.

At the 80% setting of switch 1SW and the 0% setting of fine vernier switch 2SW, the 2500-ohm fine vernier resistance is paralleled by resistor 102R which has a value of 600 ohms so that this parallel network has an effective resistance of 484 ohms. This is connected in series with a parallel resistance circuit comprising resistor 101R (500 ohms) and resistor 109R (2500 ohms). This parallel subcircuit, having an effective resistance of 417 ohms, is connected in series with the effective 484-ohm resistance to produce a total resistance of 901 ohms. To produce the same effective heat, that is, 80% heat, the coarse switch should also be able to be set at the 70% position and the vernier at the 10% position. In these positions, the total effective resistance between conductors 52 and 54 is nominally 902 ohms, resulting from the connection in parallel with one another of a first network including resistors 101R and 102R in series (for a total of 1100 ohms) and a network comprising resistors 109R and 110R (each having a value of 2500 ohms for a total of 5000 ohms).

As one further example, at a coarse setting of 70% and a vernier setting of 0%, the 2500-ohms vernier resistance is shunted by resistor 103R (having a value of 500 ohms). Serially interconnected resistors 101R and 102R (having a total resistance of 1100 ohms) are shunted by serially interconnected resistors 109R and 110R (having a total resistance of 5000 ohms). The total resistance in the circuit between conductors 52 and 54, is, therefore, 1319 ohms. Similarly, at the 60% course setting and 10% vernier setting, the same overall resistance is produced since the vernier branch resistance is zero and since at the 60% setting of switch 1SW one series circuit comprising resistors 101R and 102R and 103R, having values of 500 ohms, 600 ohms and 500 ohms, respectively, is connected in parallel with serially interconnected resistors 109R, 110R and 111R having values of 2500 ohms each.

The values of the other resistors are selected to produce the correct 10% increment of change of current (considering the curvilinearity of the relationship in each welder) coupled with the setting of the value of the next succeeding one of the primary coarse resistors so that when placed in shunt of the fine vernier resistors, the total resistance of the fine vernier will be correct for that position of switch 1SW.

While it will be apparent that the embodiment of the invention herein disclosed is well calculated to fulfill the objects of the invention, it will be appreciated that the invention is susceptible to modification, variations and change without departing from the proper scope or fair meaning of the subjoined claims.

What is claimed is:

1. Variable resistance means for use in cooperation with reactive means in a phase-shifting network for applying a phase-shifted voltage to a device responsive to the phase-shifted voltage for controlling the magnitude of a current in which the relationship between the value of said variable resistance means and the magnitude of the current is curvilinear comprising resistive means, plural position switch means for changing the total resistance of said resistive means in different increments to change the value of the current by successive preselected equal amounts, single variable resistance vernier means connected to said resistive means for varying the current in subincrements, and means for adjusting the resistance of said vernier means at each position of said switch means to a value which varies in accordance with the size of the increment of resistance added at the next position of said switch means.

2. Variable resistance means for use in cooperation with reactive means in a phase-shifting network for applying a phase-shifted voltage to a device responsive to the phase-shifted voltage for controlling the magnitude of a current in which the relationship between the value of said variable resistance means and the magnitude of the current is curvilinear comprising resistive means, plural position switch means for changing the total resistance of said resistive means in different increments to change the value of the current by successive preselected equal amounts, single variable resistance vernier means connected to said resistive means for varying the current in subincrements, and means including said switch means for adjusting the resistance of said vernier means at each position of said switch means to a value which varies in accordance with the size of the increment of resistance added at the next position of said switch means.

3. Variable resistance means for use in cooperation with reactive means in a phase-shifting network for applying a phase-shifted voltage to a device responsive to the phase-shifted voltage for controlling the magnitude of a current in which the relationship between the value of said variable resistance means and the magnitude of the current is curvilinear comprising a plurality of resistors each succeeding one of which has a value differing from the value of the combination of the preceding resistors by an amount to change the value of the current by a preselected constant amount when combined with said preceding resistors, switch means for combining said resistors, single variable resistance vernier means connected to said resistors for varying the current in subincrements, and means controlled by said switch means for adjusting the resistance of said vernier means for each said combination of preceding resistors by an amount determined by the value of each said succeeding resistor.

4. Variable resistance means for use in cooperation with reactive means in a phase-shifting network for applying a phase-shifted voltage to a device responsive to the phase-shifted voltage for controlling the magnitude of a current in which the relationship between the value of said variable resistance means and the magnitude of the current is curvilinear comprising a plurality of resistors each succeeding one of which has a value differing from the value of the sum of the preceding resistors by an amount to change the value of the current by a preselected constant amount when added to said preceding resistors, switch means for combining said resistors, single variable resistance vernier means connected to said resistors for varying the current in subincrements, and means controlled by said switch means for adjusting the resistance of said vernier means for each said combination of preceding resistors by an amount determined by the value of each said succeeding resistor.

5. Variable resistance means for use in cooperation with reactive means in a phase-shifting network for applying a phase-shifted voltage to a device responsive to the phase-shifted voltage for controlling the magnitude of a current in which the relationship between the value of said variable resistance means and the magnitude of the current is curvilinear comprising a plurality of resistors each succeeding one of which has a value differing from the value of the combination of the preceding resistors by an amount to change the value of the current by a preselected constant amount when combined with said preceding resistors, switch means for combining said resistors, single variable resistance vernier means connected to said resistors for varying the current in subincrements, and means controlled by said switch means for adjusting the resistance of said vernier means for each said combination of preceding resistors by an amount determined by the value of each said succeeding resistor comprising means including said switch means for connecting said succeeding resistor in circuit with said vernier means.

6. Variable resistance means for use in cooperation with reactive means in a phase-shifting network for applying a phase-shifted voltage to a device responsive to the phase-shifted voltage for controlling the magnitude of a current in which the relationship between the value of said variable resistance means and the magnitude of the current is curvilinear comprising first resistance means, second resistance means, plural position switch means for concurrently changing the value of both of said first and second resistance means in increments and for interconnecting said first and second resistance means for changing the combined value of said first and second resistance means in different increments to change the value of the current in preselected equal increments, single variable resistance vernier means connected to both of said resistance means for varying the combined value of said first and second resistance means in subincrements, and means for adjusting the resistance of said vernier means at each position of said switch means to a value which varies in accordance with the size of the increment of resistance added at the next position of said switch means.

7. Variable resistance means for use in cooperation with reactive means in a phase-shifting network for applying a phase-shifted voltage to a device responsive to the phase-shifted voltage for controlling the magnitude of a current in which the relationship between the value of said variable resistance means and the magnitude of the current is curvilinear comprising first resistance means, second resistance means, plural position switch means for concurrently changing the value of both of said first and second resistance means in increments and for interconnecting said first and second resistance means for changing the combined value of said first and second resistance means in different increments to change the value of the current in preselected equal increments, single variable resistance vernier means connected to both of said resistance means for varying the combined value of said first and second resistance means in subincrements, and means for adjusting the resistance of said vernier means at each position of said switch means to a value which varies in accordance with the size of the increment of resistance added at the next position of said switch means comprising means including said switch means for connecting a resistance equal in value to the next increment of said first resistance means in circuit with said vernier means.

8. The combination of claim 1 further including calibrating means comprising first adjustable resistance means connected in parallel with said resistive means for adjusting the maximum value of resistance and second adjustable resistance means connected in series with said resistive means for adjusting the minimum value of resistance.

9. A phase-shifting circuit energizable from a source of energizing alternating voltage comprising a reactive branch and a resistive branch, said resistive branch comprising electron valve means including an output circuit energizable from the source of alternating voltage and an input circuit, and means for applying a direct voltage to said input circuit for controlling said electron valve means comprising a source of controlling alternating voltage related in phase to the energizing alternating voltage, rectifying and filtering means individual to said valve means and responsive to said controlling alternating voltage for applying a controlling direct voltage to said input circuit, and means for applying an additional biasing direct voltage to said input circuit in series with said controlling direct voltage.

10. The combination of claim 9 in which said rectifying and filtering means includes two serially interconnected capacitors and two unidirectional current conducting devices individually connected in series with individual ones of said capacitors and poled to produce full-wave rectification.

11. The combination of claim 9 in which said controlling alternating voltage leads said energizing voltage in phase by 60 to 180 degrees.

12. The combination of claim 9 in which said filtering means includes a capacitor and a resistor, in which said capacitor discharges through said resistor at the termination of the application of said controlling alternating voltage, and in which said capacitor maintains said controlling direct voltage following termination of said controlling alternating voltage until the instantaneous source voltage substantially reaches zero.

13. The combination of claim 12 in which said filtering means includes a capacitor and a resistor, in which said capacitor discharges through said resistor and in which the time constant of the charging circuit for said capacitor is small relative to the time constant of said discharging circuit.

14. A polyphase phase-shifting circuit energizable from a source of energizing polyphase alternating voltage comprising a reactive branch and a resistive branch for each of the phases, each of said resistive branches comprising electron valve means including an output circuit energizable from the source of alternating voltage and an input circuit, and means for applying a direct voltage to said input circuit for controlling said electron valve means comprising a source of controlling alternating voltage related in phase to the energizing alternating voltage, rectifying and filtering means individual to said valve means and responsive to said controlling alternating voltage for applying a controlling direct voltage to said input circuit, and means for applying an additional biasing direct voltage to said input circuit in series with said controlling direct voltage, each of said electron discharge means being energizable from an individual one of said phases, said source of controlling alternating voltage being connected directly to one of said rectifying and filtering means, means for inverting the phase of said controlling alternating voltage, and means for applying said inverted controlling alternating voltage to another one of said rectifying and filtering means.

15. In a control equipment for a welder having a welding transformer controllably energizable from a source of alternating voltage, a phase-shifting circuit comprising a transformer having primary winding means and a pair of secondary winding means, said primary winding means being energizable from the source of alternating voltage, a full-wave rectifier bridge having a unidirectional current conducting device in each of four legs, an electron discharge device having an anode, a cathode and a control electrode, means connecting the anode-cathode path of said electron discharge device across one diagonal of said bridge, a load impedance connected in series with one of said secondary winding means across the other diagonal of said bridge, means including reactive means and the other one of said secondary winding means connected across said load impedance, means for applying a control voltage between said cathode and said control electrode, a source of controlling alternating voltage related in phase to the energizing alternating voltage, rectifying and filtering means individual to said valve means and responsive to said controlling alternating voltage for applying a controlling direct voltage between said cathode and control electrode, and means for applying an additional biasing direct voltage between said cathode and control electrode in series with said controlling direct voltage.

16. A phase-shifting circuit comprising a reactive branch and a resistive branch and energizable from a source of energizing alternating voltage for applying a phase-shifted voltage to a device responsive to the phase-shifted voltage for controlling the magnitude of a current in which the relationship between the value of the resistance in the resistive branch and the magnitude of the current is curvilinear; said resistive branch comprising first and second variable resistance means; said first variable resistance means comprising electron valve means including an output circuit energizable from the source of alternating voltage and an input circuit, and means for applying a direct voltage to said input circuit for controlling said electron valve means comprising a source of controlling alternating voltage related in phase to the energizing alternating voltage, rectifying and filtering means individual to said valve means and responsive to said controlling alternating voltage for applying a controlling direct voltage to said input circuit, and means for applying an additional biasing direct voltage to said input circuit in series with said controlling direct voltage; said second variable resistance means comprising first resistance means, second resistance means, plural position switch means for concurrently changing the value of both of said first and second resistance means in increments and for interconnecting said first and second resistance means for changing the combined value of said first and second resistance means in different increments to change the value of the current in preselected equal increments, single variable resistance vernier means connected to both of said resistance means for varying the combined value of said first and second resistance means in subincrements, and means for adjusting the resistance of said vernier means at each position of said switch means to a value which varies in accordance with the size of the increment of resistance added at the next position of said switch means comprising means including said switch means for connecting a resistance equal in value to the next increment of said first resistance means in circuit with said vernier means.

References Cited in the file of this patent
UNITED STATES PATENTS

| | | |
|---|---|---|
| 1,947,231 | Sabbah | Feb. 13, 1934 |
| 2,020,961 | Quarles | Nov. 12, 1935 |
| 2,401,780 | Undy | June 11, 1946 |
| 2,532,825 | Storm | Dec. 5, 1950 |
| 2,731,594 | Rockafellow | Jan. 17, 1956 |
| 2,854,622 | Boyle | Sept. 30, 1958 |
| 2,862,176 | Lustig | Nov. 25, 1958 |
| 2,879,386 | Scholtes | Mar. 24, 1959 |
| 2,929,011 | Parson | Mar. 15, 1960 |